(12) United States Patent
Ruebel (10) Patent No.: US 10,680,421 B2
(45) Date of Patent: Jun. 9, 2020

(54) CABLE CHANNEL MODULE, MODULAR ASSEMBLY OF CABLE CHANNEL MODULES AND METHOD OF ASSEMBLING A MODULAR ASSEMBLY

(71) Applicant: HellermannTyton GMBH, Tornesch (DE)

(72) Inventor: Roman Ruebel, Hamburg (DE)

(73) Assignee: HELLERMANNTYTON GMBH (DE)

( * ) Notice: Subject to any disclaimer, the term of this patent is extended or adjusted under 35 U.S.C. 154(b) by 0 days.

(21) Appl. No.: 15/970,173

(22) Filed: May 3, 2018

(65) Prior Publication Data

US 2018/0331523 A1    Nov. 15, 2018

(30) Foreign Application Priority Data

May 11, 2017    (EP) .................................... 17170732

(51) Int. Cl.
*H02G 3/06* (2006.01)
*B60R 16/02* (2006.01)
*H02G 3/04* (2006.01)

(52) U.S. Cl.
CPC ....... *H02G 3/0608* (2013.01); *B60R 16/0215* (2013.01); *H02G 3/0418* (2013.01); *H02G 3/0437* (2013.01); *H02G 3/0475* (2013.01)

(58) Field of Classification Search
CPC .. H02G 3/0608; H02G 3/0418; H02G 3/0437; B60R 16/0215
USPC ................................... 248/68.1; 59/78.1, 84
See application file for complete search history.

(56) References Cited

U.S. PATENT DOCUMENTS

| 3,188,030 | A | * | 6/1965 | Fischer | F16L 3/10 248/68.1 |
| 3,385,050 | A | * | 5/1968 | Hall | A44C 11/002 59/78 |
| 4,582,281 | A | * | 4/1986 | Van Camp | B25J 9/06 248/49 |
| 4,840,023 | A | * | 6/1989 | Borsani | F16G 13/10 248/49 |
| 5,642,612 | A | * | 7/1997 | Hughes | F16G 13/16 248/49 |

(Continued)

FOREIGN PATENT DOCUMENTS

| AU | 2008207548 A1 | 3/2010 |
| DE | 29904796 U1 | 8/1999 |

(Continued)

*Primary Examiner* — Nkeisha Smith
(74) *Attorney, Agent, or Firm* — Robert J. Myers (57) ABSTRACT

A cable channel module for receiving a portion of a cable harness is presented. The cable channel module comprises a cable supporting section having a base, a first connector, and a second of connector disposed at opposite sides of the base. The first and second connectors are first and second components of an articulated link that is configured moveable about two axes of rotation. The cable supporting section further comprises at least one, preferably two, fixing points. The fixing point is configured to receive fixing means, with the fixing means being configured to fix a relative position between two cable channel modules connected to one another via the articulated link. A modular assembly of cable channel modules and a method of assembling a modular assembly of cable channel modules is also presented.

17 Claims, 6 Drawing Sheets

(56) References Cited

U.S. PATENT DOCUMENTS

| | | | | |
|---|---|---|---|---|
| 5,824,957 | A * | 10/1998 | Holshausen | F16G 13/16 174/95 |
| 5,900,586 | A * | 5/1999 | Carr | A47B 21/06 174/95 |
| 6,367,211 | B1 * | 4/2002 | Weener | H02G 3/383 138/120 |
| 6,725,642 | B2 * | 4/2004 | Tsutsumi | F16G 13/16 248/49 |
| 7,036,338 | B2 * | 5/2006 | Hofer | A44C 11/002 29/896.411 |
| 7,240,477 | B1 * | 7/2007 | Dunfee | F16G 13/16 248/49 |
| 7,484,351 | B2 * | 2/2009 | Harada | B25J 19/0025 248/49 |
| 8,413,416 | B2 * | 4/2013 | Egami | F16G 13/16 248/49 |
| 8,534,624 | B2 * | 9/2013 | Lunitz | H02G 3/32 211/70.6 |
| 8,607,541 | B1 * | 12/2013 | Cavuoti | F16G 13/16 446/120 |
| 8,622,481 | B2 * | 1/2014 | Niederriter | E21C 29/14 299/43 |
| 9,667,045 | B2 * | 5/2017 | Kitamura | H01R 13/64 |
| 9,809,179 | B2 * | 11/2017 | Inoue | B60R 16/0215 |
| 9,972,984 | B1 * | 5/2018 | Tisbo | H02G 3/0475 |
| 10,018,249 | B2 * | 7/2018 | Komiya | F16G 13/16 |
| 2007/0277352 | A1 * | 12/2007 | Maron | A45C 3/06 24/298 |
| 2009/0272093 | A1 * | 11/2009 | Kuebel | H02G 3/0475 59/84 |
| 2010/0219311 | A1 * | 9/2010 | Ng | E06B 9/324 248/222.14 |
| 2014/0283943 | A1 * | 9/2014 | Pecoraro | H01B 7/17 138/177 |
| 2015/0121834 | A1 * | 5/2015 | Kim | H02G 11/006 59/78.1 |

FOREIGN PATENT DOCUMENTS

| | | |
|---|---|---|
| DE | 102009029957 A1 | 2/2011 |
| DE | 102011108849 A1 | 1/2013 |
| EP | 260740 A2 | 3/1988 |
| EP | 875695 A1 | 11/1998 |
| EP | 2116742 A2 | 11/2009 |

* cited by examiner

CABLE CHANNEL MODULE, MODULAR ASSEMBLY OF CABLE CHANNEL MODULES AND METHOD OF ASSEMBLING A MODULAR ASSEMBLY

CROSS-REFERENCE TO RELATED APPLICATION

This application claims the benefit under 35 U.S.C. § 119(a) of Patent Application No. 17170732.6 filed in the European Patent Office on May 11, 2017, the entire disclosure of which is hereby incorporated by reference.

TECHNICAL FIELD OF THE INVENTION

The present invention generally relates to a cable channel module.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

A cable channel module for receiving at least a portion of a cable harness, the cable channel module comprising a cable supporting section having a base; a first connector and a second of connector disposed at opposite sides of the base is presented herein. The first and second connectors are first and second components respectively of an articulated link that is configured to be moveable about at least two axes of rotation. The cable supporting section further comprises at least one, preferably two, fixing points. The fixing point is configured to receive fixing means, with the fixing means being configured to fix a relative position between two cable channel modules connected to one another via the articulated link. A modular assembly of cable channel modules and a method of assembling a modular assembly of cable channel modules is also presented herein.

In vehicles, such as automobiles, cable harnesses are designed according to geometric and electrical requirements. This means that cables, e.g. those connecting the front and rear lights of the vehicle to the lighting system, are arranged e.g. at a side of the vehicle. Further cables are provided to connect the electrical systems of the vehicles cockpit to a control system etc. The various cables are routed throughout the vehicle in a so-called cable harness.

In order to protect the cable harness from damage and to secure the harness within the vehicle, individual plastic cable channels are provided. These individual plastic cable channels differ in shape, size and extent based on the particular application within the vehicle.

In order to produce individual cable channels designed for a particular application, an individual product engineering process is carried out. This comprises the manufacture of vehicle specific injection molds and tools for each dedicated plastic cable channel. This is very time consuming process and can take up to 24 months to produce the individual plastic cable channels. This product engineering process is also associated with a high demand in effort and cost and it makes it very cost ineffective to supply customers with small batches on a small-scale production e.g. for specialty vehicles.

For this reason it is an object of the present invention to provide low cost design modular cable channels that can be used to form individual cable channels that can adopt various shapes for a variety of applications. It is a further object of the invention to make available the individual cable channels in a time efficient manner.

Such a cable channel module is configured to receive at least a portion of a cable harness. The cable channel module comprisies a cable supporting section having a base, a first connector, and a second of connector that are disposed at opposite sides of the base. The first and second connectors are first and second components of an articulated link that is configured moveable about at least two axes of rotation. The cable supporting section further incudes at least one, preferably two, fixing points. The fixing point is configured to receive fixing means. The fixing means is configured to fix a relative position between two cable channel modules that are connected to one another via the articulated link.

In this way modular individual cable channels can be provides. A modular concept in which individual modules can be connected to one another by way of an articulated link enables a tailoring of a modular assembly of cable channel modules to the geometric and electrical requirements of the individual vehicle in which the cable channel is to be installed, i.e. various routings of the cable channel modules are made available by this alternative solution for the cable guiding.

The design time of individual cable channels is significantly reduced as such modules can be universally used and the routing thereof can be configured to different environments in a very simple manner, e.g. by placing these in a vehicle by trial and error.

The demand in effort and cost in developing an individual cable channel is likewise significantly reduced. This is because no computer aided design is needed to design an individual cable channel and for this reason no corresponding mold and tool designs are required.

The one-off expenditure required for the design of prior art individual channels, as well as the corresponding molds and tools is significantly reduced as the modules can be used in a variety of vehicles. This makes individual cable channels economically feasible also in small scale productions.

Moreover, only one shape of injection tool is required to form a plurality of modules that can be connected to one another to form a variety of individual cable channels that can be used in a plethora of kinds of vehicles. Moreover, in the event that a part of a cable channel requires repair or maintenance this can simply be replaced without having to replace the complete channel.

It should also be noted that the individual modules can be packaged more dense, reducing the required packaging size and consequent cost of delivery to a customer.

Using a fixing point by means of which fixing means can be used to connect the two directly adjacent cable channel modules means that a previously flexible structure can be stiffened such that once a desired final shape of an individual cable channel has been established, e.g. by trial and error, this final shape can simply be fixed e.g. by clipping fixing means into the fixing points.

Preferably the fixing point is formed in a support arranged at the cable supporting section. Providing a support for the fixing point enables an improved connection possibility for the fixing means.

The cable supporting section may comprise two side members projecting from the base at two further sides of the base, with the support being arranged at one of the side members, preferably two supports are provided with a respective support being formed by the respective side member.

A cable supporting section is thereby made available that has a generally U-shaped form, C-shaped form, or V-shaped form. By forming the cable supporting section with a U, C, or V-shaped form, parts of the cable harness can be held therein such that they are protected from the environment.

The fixing point may be generally arranged at a tip of the side member. Arranging the respective supports at tips of the respective side members facilitates the access to the fixing points. This permits simple access to the fixing point remote from the base of the cable supporting section that supports part of a cable harness.

The fixing point may be configured to receive the fixing means by an interference fit. An interference fit, also known as a press fit, enables a secure connection between the fixing point and fixing means to be established.

The cable channel module may further include a cover that is connected to the cable supporting section and forms a cover for both the cable supporting section and the fixing point. The cover may be connected to the two side members projecting from the base. The cover, on the one hand, can thereby be used to fix a position of both part of the cable harness within the cable channel module as well as the fixing means at the fixing point. The cover can also be used to protect the cable harness from the environment.

The articulated link may be a universal joint. A universal joint enables an articulation of the respective cable channel modules relative to one another. In this connection the first connector of the universal joint is formed as a hook that is configured to cooperate with an eye and a web of the respective second connector. In this way a cardan joint is formed between connected cable channel modules.

Alternatively, the articulated link may be a ball link and the first connector is a ball and the second connector is a socket. In this way a male and female connector is provided at the module facilitating the ease and speed in which a plurality of modules can be connected to one another. Moreover, a ball link enables a movement in at least two-degrees of freedom, i.e. a two-axis routing of cable channel modules connected to one another.

The cable channel module may also include an interface that is provided by the base and/or the side members of the cable supporting section. Making an interface available at each module enables the fixation of the segment of the chain of modules to the surrounding environment. Moreover, such interfaces can also be used to fix the position of part of a cable harness within the module.

In this way the interface is, for example, an interface for fixing elements, an interface to a mount point within e.g. a vehicle and/or an interface, e.g. an eyelet, for a fastener element, such as a cable tie, used to connect part of the cable harness to the cable channel module.

According to a further aspect, the above mentioned object is satisfied by a modular assembly of multiple cable channel modules, comprising at least first and second cable channel modules. The first and second cable channel modules are as described above. The first connector of the first cable channel module is connected to the second connector of the second cable channel module to form at least a part of a flexible chain of cable channel modules.

The advantages described and discussed in the foregoing with reference to individual cable channel modules likewise hold true for the modular assembly of cable channel modules.

The first cable channel module connected to the second cable channel module may be fixedly connected to the second cable channel module by means of fixing means. The fixing means may be introduced into the respective fixing points of respective cable channel modules in order to fixedly connect the first and second cable channel modules such that their relative positions are fixed with regard to one another.

Such a modular concept enables the delivery of individual modules that can be formed to the final parts in a very short period of time, e.g. between 1 and 7 days. Moreover, the assembly of the individual modules to a flexible chain of modules and then to a rigid modular assembly can also be carried out in a very short period of time, namely in a few minutes, e.g. 1 to 6 minutes. This can be effected by connecting first and second connectors of directly adjacent cable channel modules, then rotating the respective cable channel modules such that the desired final shape is obtained and then fixing the relative orientation by way of the fixing means.

The fixing means may generally have the shape of a pearl chain. Such pearl chains comprise a string and cubes, spheres, or other shapes regularly arranged at predefined spacing along the length of the string. The fixing means may alternatively be formed by clips or other kinds of fixing means that enable the relative rotation of the individual cable channel modules to be fixed in position.

In contrast to flexible concepts, a rigid modular assembly can not only be configured to conform to the space that is available for the installation of the modular assembly, but it can also be accurately fixed in position and can be used in a reproducible manner. The fixing means inserted into the respective fixing points of the respective cable channel modules enables a quick assembly with low manual effort and a high process reliability.

A method of assembling a modular assembly of cable channel modules, the method comprises the steps of:
providing a plurality of cable channel modules, such as the cable channel modules discussed in the foregoing;

connecting first connectors of respective cable channel modules to second connectors of respective cable channel modules arranged adjacent to the first connectors of adjacent cable channel modules to obtain a flexible chain of cable channel modules;

arranging the flexible chain of cable channel modules such that the flexible chain adopts a desired final shape of the modular assembly of cable channel modules; and connecting fixing means to each of the plurality of connected cable channel modules to form the modular assembly of cable channel modules having the rigid final shape.

The advantages described in the foregoing with reference to the individual modules and the modular assembly likewise hold true for the method described herein.

Figure 1:
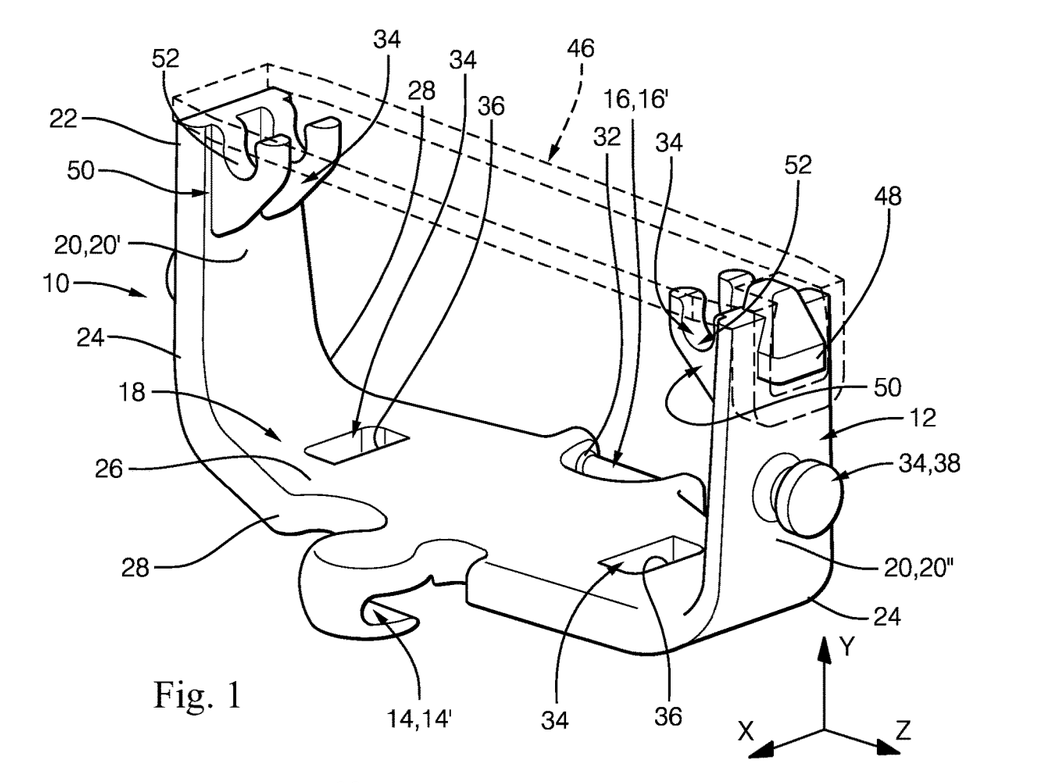
FIG. 1 is a schematic view of a cable channel module according to a first embodiment of the invention.

FIG. 1 shows a schematic view of a first embodiment of a cable channel module 10 for receiving a portion of a cable harness 70 (see FIG. 9 in this regard). The cable channel module 10 comprises a cable supporting section 12, a first connector 14 and a second connector 16 disposed opposite from one another.

The cable supporting section 12 is generally U-shaped such that it is open to one side. The cable harness 70 is introduced via this open side in a direction generally transverse to the first and second connectors 14, 16. In this connection the Cartesian coordinates X, Y and Z are indicated in FIG. 1, with the direction of introduction of the cable harness 70 transverse to the direction of the first and second connectors 14, 16 essentially corresponding to a direction lying within the Z-Y plane in the example shown. To form the open side the cable supporting section 12 has a base 18 and two side members 20 projecting from two oppositely disposed sides 24 of the base 18.

The two side members 20 are generally trapezoidal in shape. The shape of the two side members 20 is selected such that it tapers from the base 18 to a tip 22. The two side members 20 extend generally perpendicular from the base 18. Thereby the two side members 20 form part of an enclosure in which part of a cable harness 70 (see FIG. 9 in this regard) can be received. The cable supporting section 12 has a surface 26 that is configured to receive a part of the cable harness 70, with the surface 26 being arranged between the two side members 20.

A height of each side member 20 from the base 18 to the tip 22 can be selected in the range of from 0.5 cm to 8 cm. The height of the side members 20 depends on a thickness of the cable harness 70 that is to be guided in the respective cable channel module 10. This means that applications exist in which cable channel modules 10 of varying height are assembled to form a modular assembly 62 (see e.g. FIG. 5 in this regard) of cable channel modules 10.

Generally speaking a size of the base 18 is selected in the range of 1 to 8 cm by 2 to 16 cm. The selected size depends on the size of the cable harness 70 to be guided in the respective cable channel module 10. This means that applications exist in which cable channel modules 10 of varying size can be assembled to form the modular assembly 62 of cable channel modules 10.

A thickness of the base 18 and of the two side members 20 can generally be selected in the range of 1 to 10 mm depending on the application of the cable channel module 10.

The cable channel modules 10 can be made of a plastic, such as thermosetting polymers and thermoplastics, e.g. polystyrene (PS) or polyethylene (PE), preferably an ESD compliant plastic or polymer. The cable channel modules 10 can be formed in an injection molding process or in an extrusion process. Thereby a light weight and simple to manufacture cable channel module 10 can be obtained.

The first connector 14 and the second connector 16 are oppositely disposed from one another at two sides 28 of the base 18 of the cable supporting section 12. The base 18 in this way has at least four sides 24, 28 in essentially one plane defined by the base 18, with the two sides 28 extending between the two sides 24 from which the two side members 20 project.

Moreover, the first and second connectors 14, 16 are respective components of an articulated link. In the present instance the articulated link is a form of universal joint 30 (see FIGS. 8a-8e in this regard), also known as a cardan joint.

To this end the first connector 14 is formed as a hook 14' that can engage an eye 16' having a web 32 of the second connector 16 of a further cable channel module 10. Part of the outer surface of the hook 14' is curved in shape and part of the inner surface of the eye 16' has a complementary curvature to allow two axes of rotation for the first and second connectors 14, 16 relative to the web 32 (see FIGS. 8a-8e illustrating different modes of articulation possible using the universal joint 30).

Various interfaces 34 are visible at the cable channel module 10 of FIG. 1. To this end two slots 36 are formed in the base 18 and two mushroom heads 38 are formed at the two side members 20.

Figure 2A:
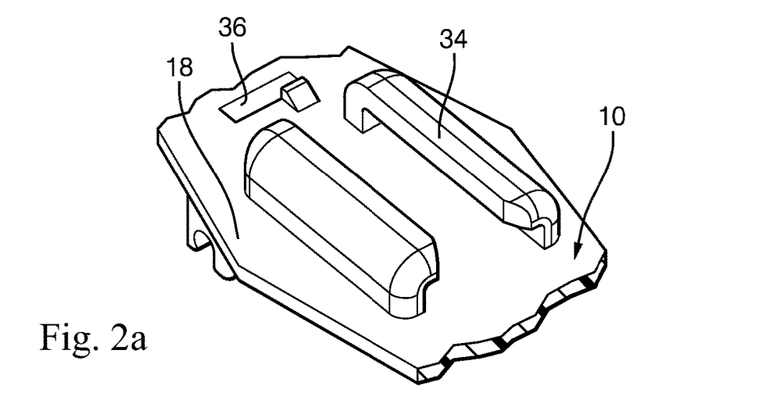
FIG. 2a is a partial views from below of the cable channel module of FIG. 1 according to the first embodiment of the invention.
Figure 2B:
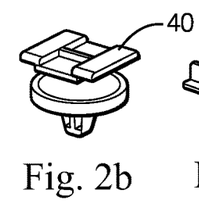
FIGS. 2b-2f are schematic views of various fixing elements of the cable channel module of FIG. 1 according to the first embodiment of the invention.
Figure 2C:
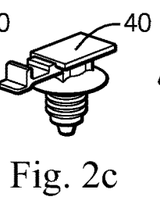
Figure 2D:
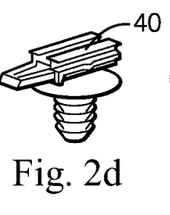
Figure 2E:
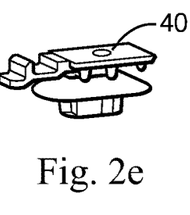
Figure 2F:
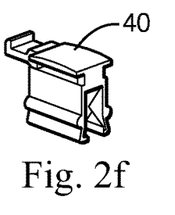

The respective interface 34 can be configured as an interface for a fixing element 40 (see FIG. 2b in this regard). Additionally or alternatively the interface can be an interface to a mount point (not shown). Additionally or alternatively the interface 34 can be an interface to a fastener element 44, e.g. a cable tie, (see FIG. 9 in this regard) used to fasten the cable harness 70 to the cable channel module 10.

A cover 46 is connected to the respective tips 22 of the two side members 20 of the cable supporting section 12 via two connections 48. The two connections 48 permit a removal of the cover 46, so that one can access the installed cable harness 70, e.g. for the purpose of maintenance. The two connections 48 can be respective parts of a snap on connection or can be configured in a different way.

Two supports 50 are arranged beneath the cover 46 at each side member 20 in the region of the respective tip 22 at an inner surface 20' of the side members 20. The two supports could also be arranged at an outer surface 20" of the respective side member 20 as shown e.g. in FIG. 4.

The two supports 50 are arranged within the enclosure formed by the cover 46 and face one another. Interfaces 34 are formed in each support, with the respective interface 34 being configured to receive a fastener element 44, such as a cable tie (see FIG. 9). Moreover, each support comprises a fixing point 52, the function of which will be explained in the following.

FIG. 2a shows a partial view from below of the cable channel module of FIG. 1. This comprises a further interface 34 in the form of oppositely disposed channels that are configured to receive fixing elements 40 such as the ones shown in FIG. 2b. The various fixing elements 40 shown in FIG. 2b are manufacturer specific fixing elements 40. Using manufacturer specific fixing elements 40 to connect the cable channel modules 10 to a chassis or other components of a vehicle (not shown) facilitates the ease and speed of installation of the modular assembly 62.

In this way the modular assembly 62 can be connected to parts of the chassis using manufacturer specific fixing elements 40. This permits the cable harness 70 of the vehicle to be guided within the modular assembly 62 in such a way that electrical components of the vehicle can be interconnected to one another, to a vehicle battery, and/or to control components of the vehicle by way of the cable harness 70. By using fixing elements 40 that are formed from existing HT-products, e.g. for fixation, can improve the number of sales achievable by this product.

Figure 3A:
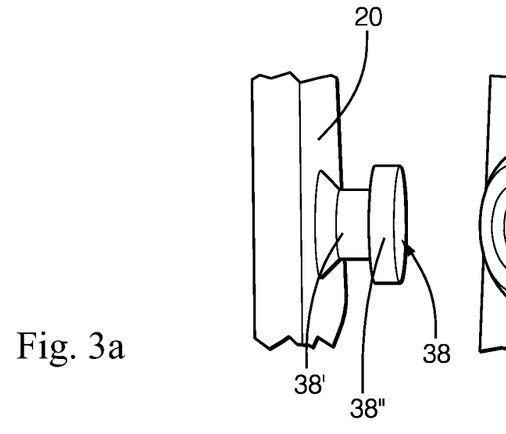
FIGS. 3a and 3b are partial views of a side member of the cable channel module of FIG. 1 according to the first embodiment of the invention.

FIG. 3a shows a partial view of the side member 20 of the cable channel module 10 of FIG. 1 on the left hand side. The shape of the mushroom head 38 forming an interface 34 can clearly be seen. The mushroom head 38 has a pillar 38' with a head 38" having a larger outer diameter than the pillar 38'. The mushroom head 38 is configured to engage e.g. a mounting point at which the mushroom head 38 can be pivotally mounted on installing a modular assembly of cable channel modules in the vehicle. Alternatively the mushroom head 38 can be pivotally mounted at mushroom head fixing elements 42 as shown in FIG. 3b.

Rather than selecting a mushroom head 38 as an interface 34, a counter element 42' for a mushroom head can be provided as shown on the right at the side member shown in FIG. 3a. The counter element 42' for the mushroom head is then configured to receive and pivotally engage a corresponding mushroom head (not shown) formed at a mount point or a fixing element having a mushroom head formed thereon (not shown).

Figure 3B:
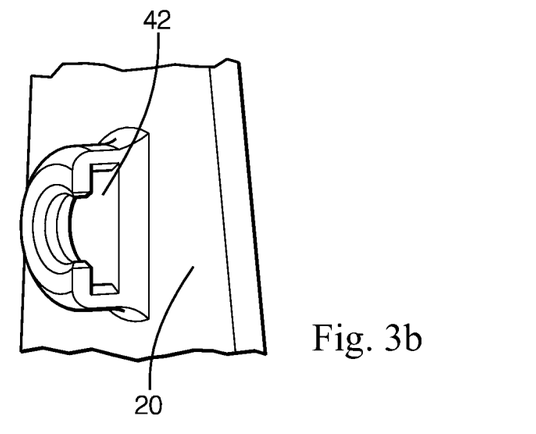
Figures 3C, 3D:
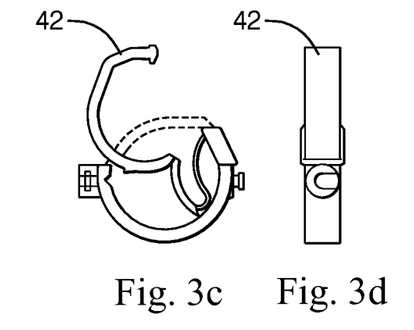
FIGS. 3c-3f are schematic views of further various fixing elements of the cable channel module of FIG. 1 according to the first embodiment of the invention.
Figures 3E, 3F:
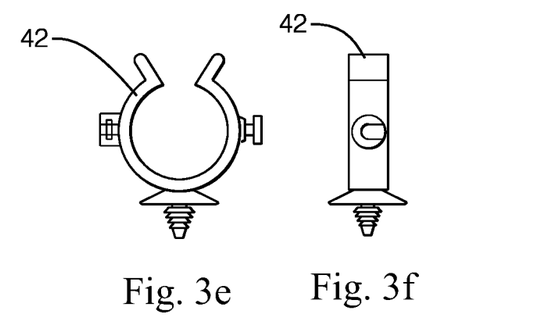

FIG. 3b shows various designs of mushroom head fixing elements 42 that each permit a connection of the mushroom head 38 of the cable channel module 10 to a vehicle component in such a way that the cable channel module 10 can be mounted, e.g. pivotally, at the vehicle component.

Figure 4:
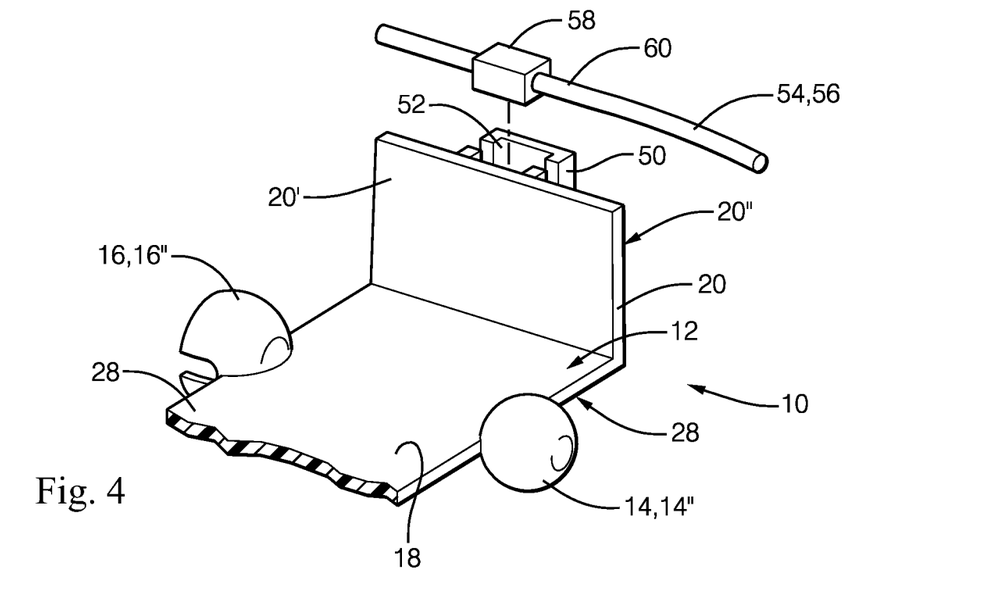
FIG. 4 is a schematic partial view of a cable channel module according to a second embodiment of the invention.

FIG. 4 shows a schematic partial view of a second embodiment of the cable channel module 10. This second embodiment includes a further kind of design of the first and second connectors 14, 16. The first and second connectors 14, 16 are also respective components of an articulated link. In the present instance the first and second connectors can also be referred to as male and female connectors.

The articulated link of FIG. 4 is configured as a ball link. For this purpose the first connector 14 is configured as a ball 14" and the second connector 16 is configured as a socket 16" configured to receive the ball 14" from a further cable channel module 10 (see e.g. FIG. 5 in this regard).

The supports 50 of this embodiment are arranged on the outer surface 20" of the side member and include respective fixing points 52. The fixing points 52 are configured to receive fixing means 54. The fixing means 54 are used to fix the position of two cable channel modules 10 connected to one another in an articulated manner by means of the first and second connectors 14, 16 to form the rigid modular assembly 62.

Specifically the fixing points 52 are configured to receive the fixing means 54 by way of an interference fit. In the present example the fixing means 54 are configured in the form of a pearl chain 56 comprising cubes 58 attached to a string 60.

Figure 5:
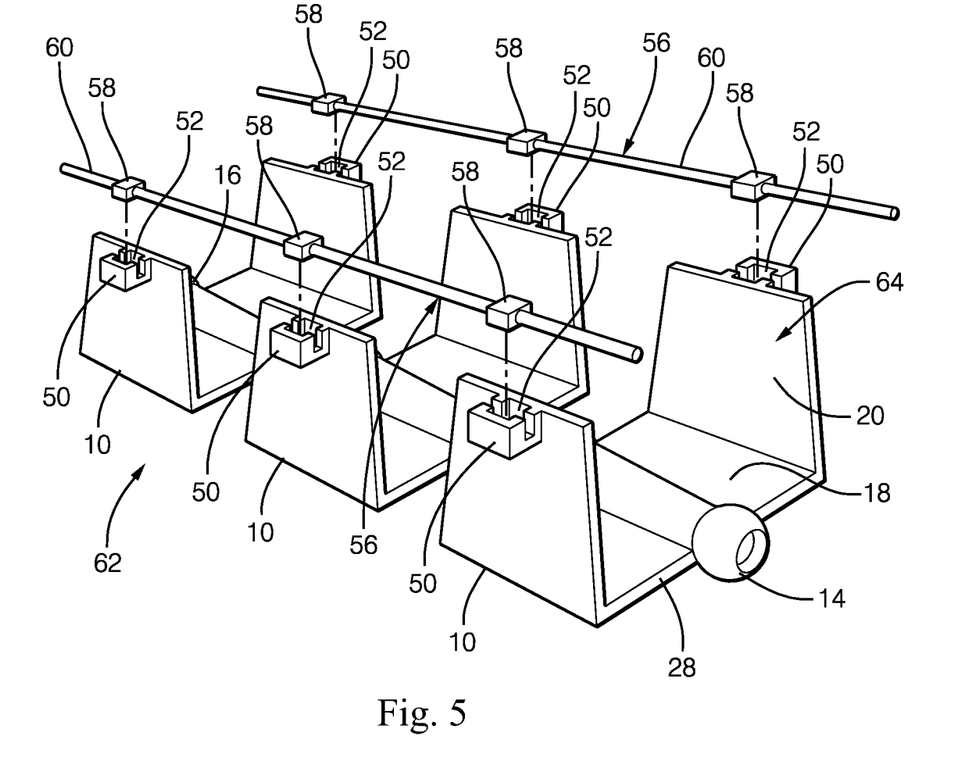
FIG. 5 is a schematic view of a modular assembly of cable channel modules according to the second embodiment of the invention.

FIG. 5 shows a schematic view of a modular assembly 62 of cable channel modules 10 according to the second embodiment. The first connector 14 of the first cable channel module 10 is connected to the second connector 16 of the second cable channel module 10 and the first connector 14 of the second cable channel module 10 is connected to the second connector 16 of the third cable channel module 10 to form a flexible chain 64 of cable channel modules 10.

Once the flexible chain 64 of cable channel modules 10 has been obtained, the cable channel modules 10 are fixedly connected to one another by means of two pearl chains 56. The fixed connection made available by the two pearl chains 56 stiffens the flexible chain 64 to such an extent that adjacent cable channel modules 10 maintain their position and a rigid modular assembly 62 is obtained.

Figure 6A:
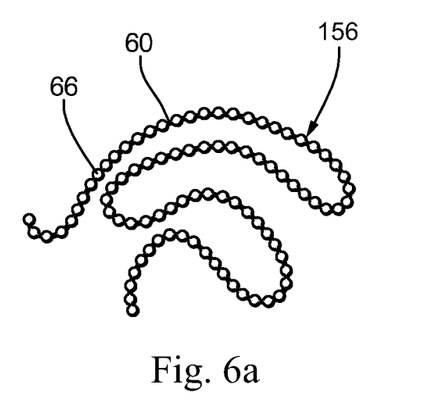
FIGS. 6a and 6b illustrate various examples of further pearl chains according to the second embodiment of the invention.
Figure 6B:
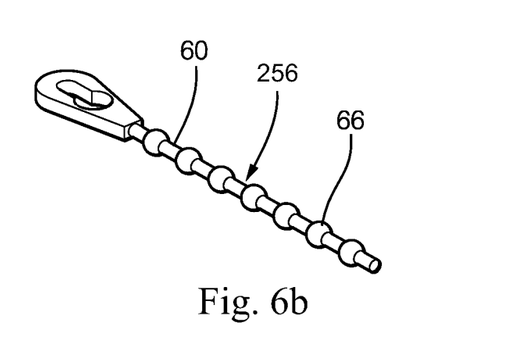

FIGS. 6a and 6b shows various examples of further pearl chains 156, 256. In both instances the pearl chains 56 comprise spheres 66. The pearl chain 156 is a chain normally used in connection with a plug for a bath basin or a kitchen sink (both not shown). The pearl chain 256 is a partial view of a beaded cable tie wrap.

In both examples shown in FIGS. 6a and 6b the individual spheres 66 of the pearl chains 156, 256 are spaced apart at comparatively short distances enabling a large variety of rigid modular assemblies 62 to be obtained.

In this connection it should be noted that the pearl chains 56, 156, 256 have an undulating shape along its length. The peaks of the undulating shape then act as the part of the fixing means 54 that engage the respective fixing point 52, e.g. by being inserted therein. The peaks in this connection can configure a plethora of different shapes, such as that of the cubes 58 of pearl chain 56 and that of the spheres 66 of pearl chains 156, 256.

Figure 7A:
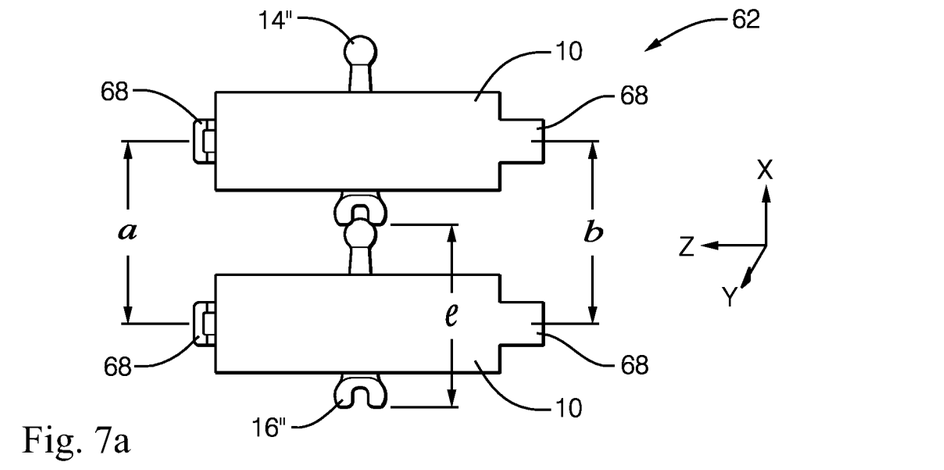
FIGS. 7a to 7c are views of two connected cable channel modules shown in FIG. 4 in different modes of articulation according to the second embodiment of the invention.
Figure 7B:
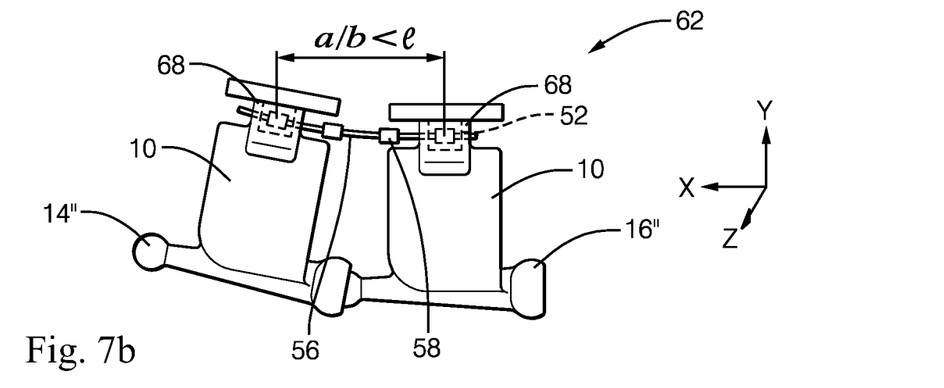
Figure 7C:
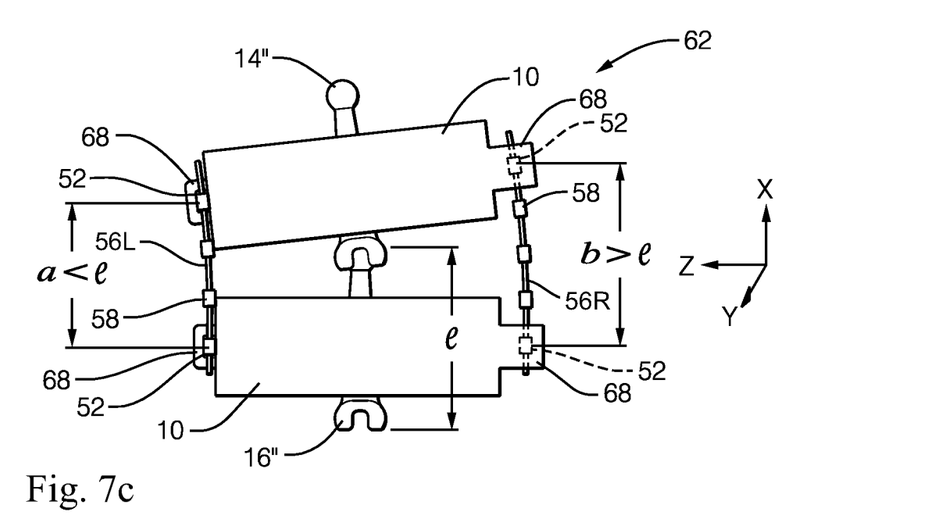
Figure 8A:
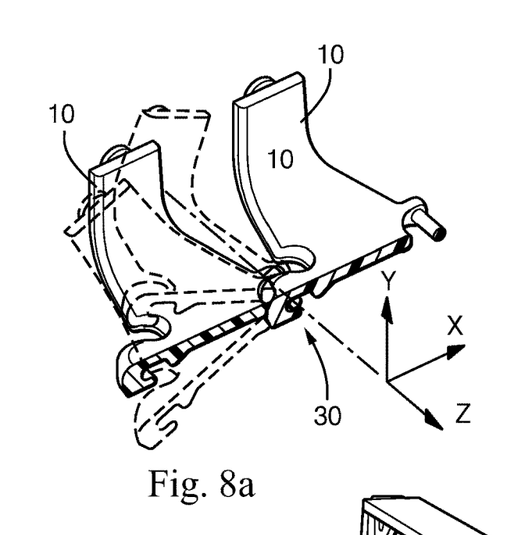
FIGS. 8a-8e are views of two connected cable channel modules of FIG. 1 in different modes of articulation according to the first embodiment of the invention.
Figure 8B:
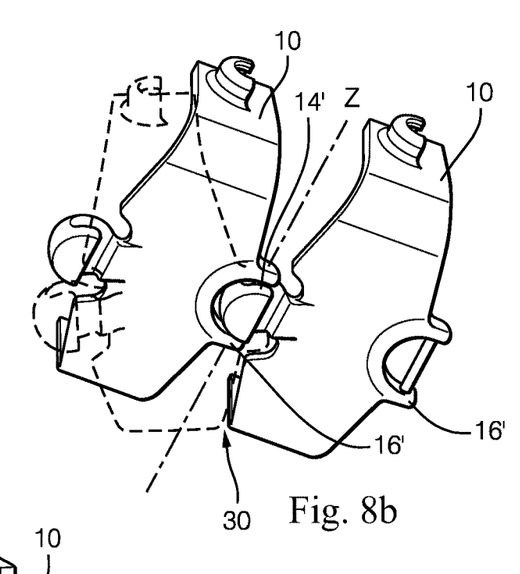
Figure 8C:
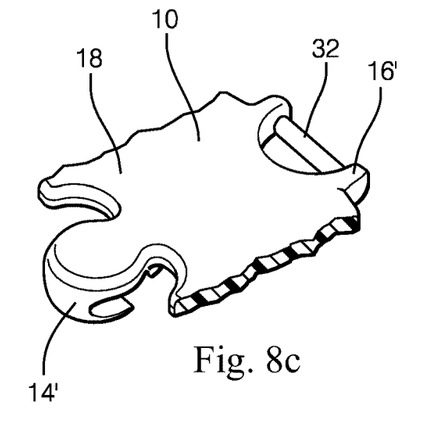
Figure 8D:
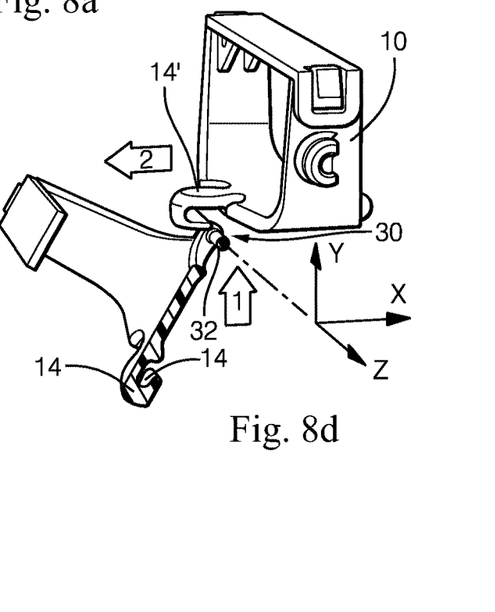
Figure 8E:
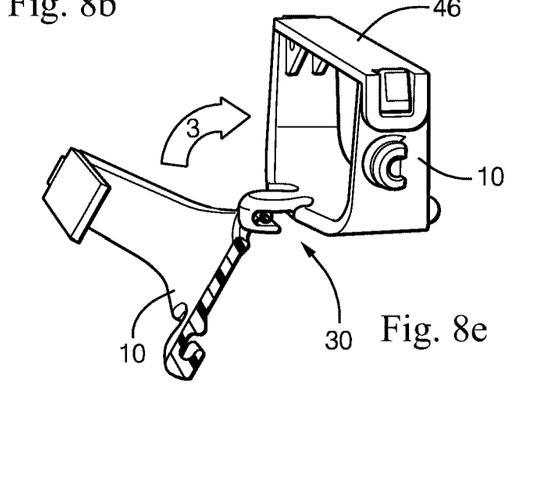

FIGS. 7a to 7c show various views of two connected cable channel modules 10 in different modes of articulation in order to more exactly define the function of the pearl chain 56 and to thereby explain how different forms of routings can be made available using an assembled flexible chain 64 of cable channel modules 10.

FIG. 7a shows two cable channel modules 10 prior to being connected to one another. For ease of reference the Cartesian coordinate system in the X-Y-Z-directions is also indicated. A length l of each cable channel module 10 is defined as the length of a line running from the first connector 14 to the second connector 16.

A length a between the left hand fixing points 52 used to fix the two cable channel modules 10 by way of the pearl chain 56 is indicated at the left hand side of FIG. 7a. A length b between the right hand fixing points 52 used to fix the two cable channel modules 10 by way of the pearl chain 56 is indicated at the right hand side of FIG. 7a. Both the length a and the length b are measured from geometric centers 68 of each cable channel module 10.

Since the two cable channel modules 10 of FIG. 7a are arranged essentially in parallel to one another, the length a=the length b and corresponds to the length l. This means that for straight line routing of the cable channel modules a=b=l is selected.

FIG. 7b shows a side view of the modular assembly 62. In this connection the left hand cable channel module 10 is pivoted upwardly with respect to the right hand cable channel module 10 in the y-direction. In order to achieve an upwardly directed routing the ratio of the lengths a/b, i.e. a ratio of the length of the respective pearl chains 56 is less than the length l of the cable channel module 10. Thus, to achieve, e.g. a straight line routing that is directed upwardly, a=b and both are less than l. Consequently in order to effect a downwardly directed routing the ratio of the lengths a/b has to be greater than the length l (e.g. a=b>l).

FIG. 7c shows the modular assembly 62 affecting a left hand curve in the z-direction. To this end the length a is less than the length l of the cable channel module 10 and the length b is greater than the length l of the cable channel module 10, i.e. a length of the left hand pearl chain 56L is selected shorter than the length of the right hand pearl chain 56R. Consequently in order to effect a right hand curve the length a of the left hand pearl chain 56L has to be greater than the length l of the cable channel module 10 and the length b of the right hand pearl chain 56R has to be less than the length 1 of the cable channel module 10.

Not shown but also feasible due to the articulated link present between adjacent cable channel modules 10 is a routing in both the y-direction and the z-direction. In this instance combinations of the above ratios have to be selected.

FIGS. 8*a*-8*e* show views of two connected cable channel modules 10 of the first embodiment in different modes of articulation. The universal joint 30 shown enables the same degrees of articulation as the ball link depicted in FIG. 7. The direction of extent of the web 32 of the universal joint 30 coincides with the Z-axis in the drawings.

The hook 14' forming the first connector 14 can be pivoted about the web 32 in the Y-direction. The rounded shape of the outer surface of the hook 14' can rotate within the eye 16' of the second connector 16 enabling a pivot of the cable channel modules 10 relative to one another in the Z-direction.

Also shown is a cut away section of the cable channel module 10 according to the first embodiment. The round shape of the hook 14' can clearly be seen as can the complementary shaped internal surface of the eye 16' and the web 32 at which a further hook of a further cable channel module 10 can engage.

FIGS. 9*a* to *f* show views showing the steps carried out to assemble a modular assembly 62 of cable channel modules 10.

Figure 9A:
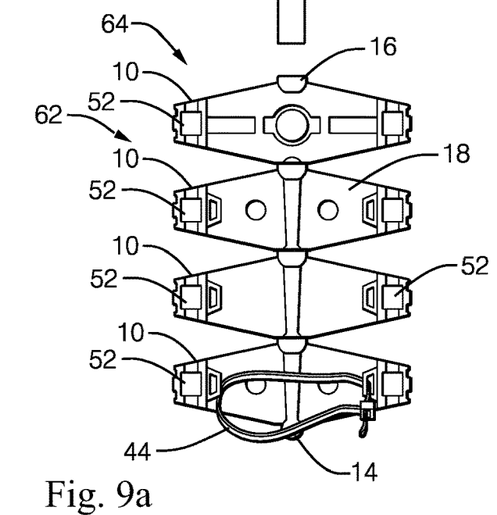
FIGS. 9a-9f are views showing the steps carried out to assemble a modular assembly of cable channel modules.

In a first step shown in FIG. 9*a* four cable channel modules 10 are provided. The first connectors 14 of respective cable channel modules 10 have been inserted into the second connectors 16 of adjacent cable channel modules 10 to obtain the flexible chain 64 of cable channel modules 10.

A fastener element 44 in the form of a cable tie is introduced into one of the cable channel modules 10 via respective eyes forming the interface 34 for the fastener element 44.

Figure 9B:
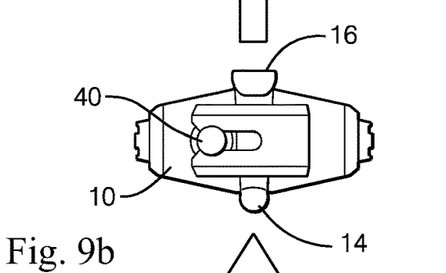

FIG. 9*b* shows the attachment of a fixing element 40 to the interface 34 of one of the cable channel modules 10. The fixing element 40 will subsequently be used to fix the modular assembly 62 to the vehicle.

Figure 9C:
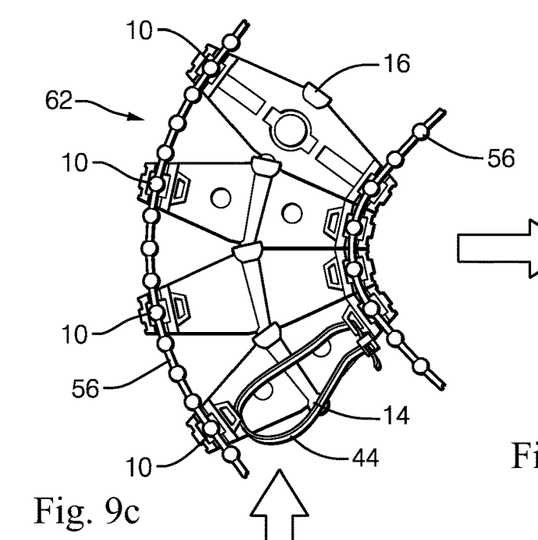

FIG. 9*c* shows the step of fixing the flexible chain 64 of cable channel modules 10 by means of the pearl chain 56. The flexible chain 64 is thereby fixed in position such that a predefined rigid final shape of the modular assembly 62 of cable channel modules 10 is obtained.

Figure 9D:
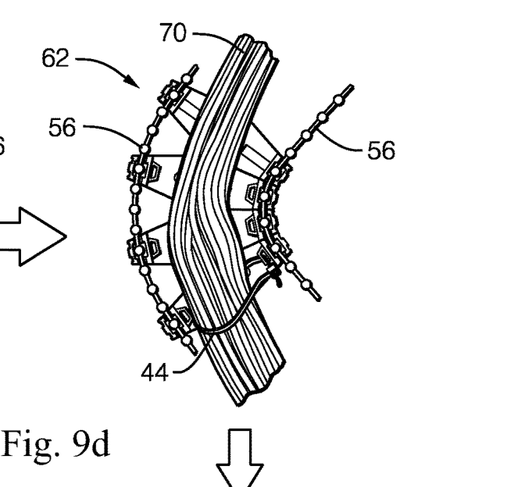

FIG. 9*d* shows the step of placing part of a cable harness 70 into the modular assembly 62. Once in situ the fastener element 44 is fastened to hold the part of the cable harness 70 in a fixed position.

Figure 9E:
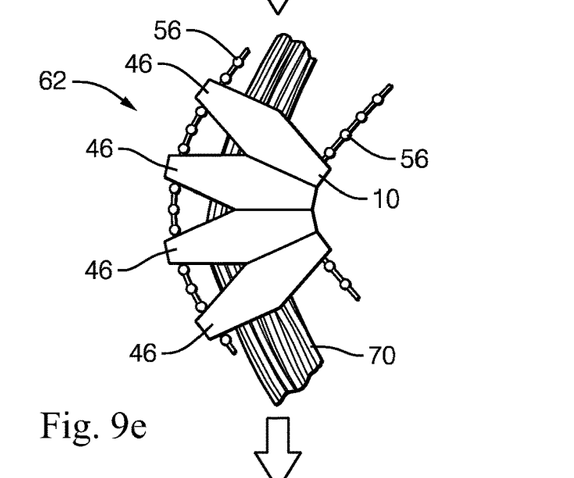
Figure 9F:
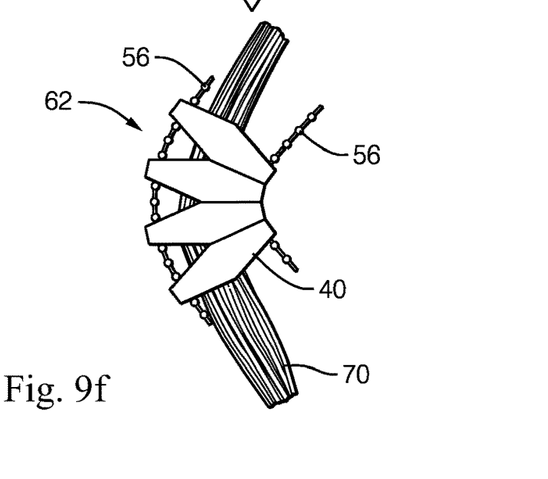

FIG. 9*e* shows the step of applying the covers 46 to the respective cable channel modules 10. The cover 46 aids the protection of the cable harness 70 from the environment. Following the step shown in FIG. 9*e*, the assembled modular assembly 62 comprising the cable harness 70 is inserted and fixed to the vehicle as indicated in FIG. 9*f*.

It should be noted in this connection that rather than fixing the routing of the assembled modular assembly 62 outside of the vehicle, the flexible chain 64 of cable channel modules 10 can be inserted into the vehicle and the step of fixing the flexible chain 64 by means of the pearl chain 56 can be conducted within the vehicle. In this way the step of fastening the cable harness 70 to the modular assembly 62 and the step of placing the covers 46 onto the cable channel modules 10 is likewise conducted within the vehicle.

It should also be noted that if the two or more modular assemblies 62 of varying shape are provided within a vehicle then some of the modular assemblies may be assembled outside of the vehicle such that a rigid modular assembly 62 having the final shape is inserted into the vehicle, whereas other modular assemblies may be inserted as flexible chains 64 which are then finally assembled within the vehicle.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'One or more' includes a function being performed by one element, a function being performed by more than one element, e.g., in a distributed fashion, several functions being performed by one element, several functions being performed by several elements, or any combination of the above.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

That while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

LISTING OF REFERENCE NUMBERS

10 cable channel module
12 cable supporting section
14 first connector
14' hook
14" ball
16 second connector
16' eye
16" socket
18 base
20 side member
20' inner surface 20" outer surface
22 tip
24 side
26 surface
28 side
30 universal joint
32 web
34 interface
36 slot
38 mushroom head
38' pillar
38" head
40 fixing element
42 mushroom head fixing element
42' counter element for a mushroom head
44 fastener element
46 cover
48 connection
50 support
52 fixing point
54 fixing means
56 pearl chain
58 cube
60 string
62 modular assembly
64 flexible chain
66 spheres
68 center
70 cable harness
a length
b length
l length

I claim:

1. A modular cable channel assembly, comprising:
a plurality of fixing means interconnected to one another by a string-like element; and
a plurality of cable channel modules, each cable channel module-including a cable supporting section having a base and two side members, each of the two side members defining two hook shaped fixing points configured to receive one of the fixing means of the plurality of fixing means therebetween and a first connector and a second connector disposed at opposite sides of the base; wherein the first and second connectors are first and second components of an articulated link that is moveable about two axes of rotation, wherein a first fixing means of the plurality of fixing means is received in a first fixing point of a first cable channel module of the plurality of cable channel modules and a second fixing means of the plurality of fixing means connected to the first fixing means by the string-like element is received in a second fixing point of a second cable channel module of the plurality of cable channel modules connected to the first cable channel module via the articulated link, thereby fixing a relative position between the first cable channel module and the second cable channel module.

2. The modular cable channel assembly in accordance with claim 1, wherein the two hook shaped fixing points are generally arranged at a tip of one of the two side members.

3. The modular cable channel assembly in accordance with claim 1, wherein the two hook shaped fixing points are configured to receive one of the fixing means by an interference fit.

4. The modular cable channel assembly in accordance with claim 1, further comprising a cover that is connected to the cable supporting section and forms the cover for both the cable supporting section and the fixing points, wherein the cover is connected to the two side members.

5. The modular cable channel assembly in accordance with claim 1, wherein the articulated link is a universal joint.

6. The modular cable channel assembly in accordance with claim 5, wherein the first connector of the universal joint is formed as a hook that is configured to cooperate with an eye and a web of the second connector.

7. The modular cable channel assembly in accordance with claim 1, wherein the articulated link is a ball link and the first connector is a ball and the second connector is a socket.

8. The modular cable channel assembly in accordance with claim 1, further comprising an interface, with the interface being provided by at least one of the base and the two side members of the cable supporting section.

9. The modular cable channel assembly in accordance with claim 8, wherein the interface is an interface for fixing elements.

10. The modular cable channel assembly in accordance with claim 8, wherein the interface is an interface to a mount point.

11. The modular cable channel assembly in accordance with claim 8, wherein the interface is an interface for a fastener element.

12. The modular cable channel assembly in accordance with claim 1, wherein each of the fixing means has a cubic shape.

13. The modular cable channel assembly in accordance with claim 1, wherein each of the fixing means has a spherical shape.

14. The modular cable channel assembly in accordance with claim 1, wherein the plurality of fixing means interconnected to one another by a string-like element is a first plurality of fixing means interconnected to one another by a first string-like element, wherein the modular cable channel assembly further comprises a second plurality of fixing means interconnected to one another by a second string-like element, and wherein a third fixing means of the first plurality of fixing means is received in a third fixing point of the first cable channel module and a fourth fixing means of the second plurality of fixing means is received in a fourth fixing point of the second cable channel module connected to the first cable channel module via the articulated link, thereby further fixing a relative position between the first cable channel module and the second cable channel module.

15. The modular cable channel assembly in accordance with claim 14, wherein a first distance between the first fixing means and the third fixing means is less than a second distance between the second fixing means and the fourth fixing means, thereby curving the modular cable channel assembly.

16. The modular cable channel assembly in accordance with claim 14, wherein a first distance between the first fixing means and the third fixing means is equal to a second distance between the second fixing means and the fourth fixing means, thereby straightening the modular cable channel assembly.

17. A method of assembling a modular assembly of cable channel modules, comprising the steps of:
providing a plurality of fixing means interconnected to one another by a string-like element;
providing a plurality of cable channel modules, each cable channel module including a cable supporting section having a base and two side members, each of the two side members defining two hook shaped fixing points configured to receive one of the fixing means of the plurality of fixing means therebetween and a first connector and a second connector disposed at opposite sides of the base; wherein the first and second connectors are first and second components of an articulated link that is moveable about two axes of rotation, wherein a first fixing means of the plurality of fixing means is received in a first fixing point of a first cable channel module of the plurality of cable channel modules and a second fixing means of the plurality of fixing means connected to the first fixing means by the string-like element is received in a second fixing point of a second cable channel module of the plurality of cable channel modules connected to the first cable channel module via the articulated link, thereby fixing a relative position between the first cable channel module and the second cable channel module;

connecting first connectors of respective cable channel modules to second connectors of the plurality of cable channel modules arranged adjacent to the first connectors of adjacent cable channel modules to obtain a flexible chain of cable channel modules;

arranging the flexible chain of cable channel modules such that the flexible chain of cable channel modules adopts a desired final shape of the modular assembly of cable channel modules; and connecting the plurality of fixing means to each of the plurality of connected cable channel modules to form the modular assembly of cable channel modules having a rigid final shape.

* * * * *